Aug. 23, 1927.
E. H. GATES
MEASURING INSTRUMENT
Filed July 6, 1925
1,639,936
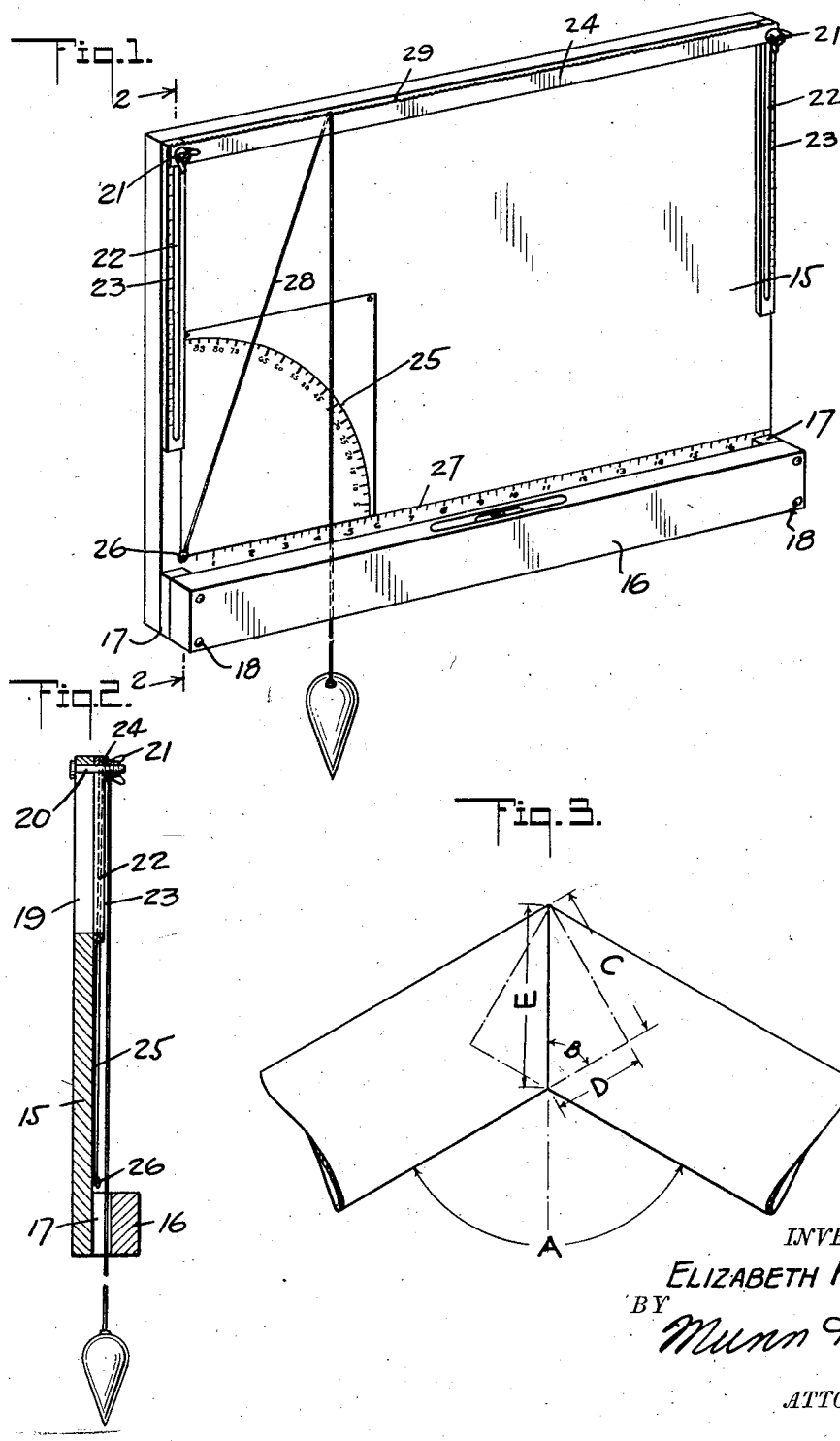
INVENTOR.
ELIZABETH H. GATES
BY
Munn & Co.
ATTORNEY Patented Aug. 23, 1927.

1,639,936

UNITED STATES PATENT OFFICE.

ELIZABETH H. GATES, OF LOS ANGELES, CALIFORNIA.

MEASURING INSTRUMENT.

Application filed July 6, 1925. Serial No. 41,846.

My invention relates to measuring instruments and more particularly to an instrument by which an unknown dimension of a side or angle of a triangle can be readily obtained, and the purpose of my invention is the provision of an instrument of this character which is particularly adapted, although not necessarily, for use in determining the angle at which the confronting ends of two pipes are to be cut in order to provide a perfect butt joint between the two when desiring to form an elbow of a predetermined angle.

Another purpose of my invention is the provision of a measuring instrument of the above described character which is capable of being successfully used by one unfamiliar with trigonometry and which is readily adjustable to accommodate itself to pipes of different diameters, the instrument embodying the use of a protractor co-operating with the plumb line and leveling device in such manner that with a given diameter of pipe and the included angle between the pipes, the distance from the jointed ends of the pipe at which the cuts are to be made can be directly read upon a graduated straight edge.

I will describe only one form of measuring instrument embodying my invention and will then point out the novel features thereof in claims.

In the accompanying drawings

Figure 1 is a view showing in perspective one form of measuring instrument embodying my invention.

Figure 2 is a vertical sectional view taken on the line 2—2 of Figure 1.

Figure 3 is a fragmentary view showing in side elevation a pipe elbow joint formed by the use of my invention and showing diagrammatically the dimensions necessary in determining the angle at which the meeting ends of the two pipes are adapted to be cut.

Referring specifically to the drawings, in which similar reference characters refer to similar parts in each of the views, my invention in its present embodiment comprises a support 15 which is flat and retangular in form and with a relatively broad base by which it may be supported in upright position as shown, such base comprising a spirit level 16 co-extensive in length with the board and secured in spaced relation thereto by means of spacing blocks 17 through which screws 18 or other suitable fastening members may extend.

Along its side edges, the support 15 is formed with vertically extending slots 19 (Figure 2) in which work screw bolts 20 having winged nuts 21, the threaded ends of the bolts extending through the slots 22 of rules 23 having graduated scales secured in upright position on the front side of the support. The bolts 20 also extend through suitable openings formed in the opposite ends of a bar 24 spanning the rules 23 and engaged by the nuts 21 for securing the bar against displacement from the bolts. It will be clear from this construction that the bar 24 is capable of being adjusted vertically on the support and that the vertical position on the bar can be determined by reference to the scales of the rule 23.

On the front side of the support is secured a protractor designated at 25 with its index 26 at one end of a linear scale 27 extending longitudinally along the lower edge of the support. Pivotally connected to the index 26 is a plumb line 28 which is adapted to be extended over the bar 24 with the upper edge of the bar provided with serrations 29 by which the plumb line can be releasably secured in any adjusted position along the length of the bar. That portion of the plumb line extending upwardly from the index to the bar will be hereinafter referred to as the inclined stretch and the portion extending downwardly from the bar and disposed perpendicularly will hereinafter be termed the vertical stretch. The vertical stretch extends downwardly in intersecting relation to the linear scale 27 and between the support 15 and the spirit level 16 with the lower end of the stretch provided with a plumb bob.

By reference to Figure 3, it will be seen that in practice the angle at which the confronting ends of a pair of pipes are to be cut to form an elbow of any desired angle is determined by dividing the included angle designated at A by two which will be the angle B of the triangle described by the sides C, D and E. The side C being the outside diameter of the pipe is known and there remains to determine the length of the side D in order to ascertain the point from the end of the pipe at which it is to be cut to mate with an identically cut pipe in forming the elbow.

In employing the instrument, the bar 24 is adjusted vertically on the support 15 until the distance from the index 26 of the protractor 25 to the upper edge 29 of the bar is equal to the diameter of the pipe as can be determined by reference to the rules 23. The plumb line 28 is now moved along the bar 24 until the inclined stretch points to or intersects the degree of the angle B on the protractor scale when by leveling the support as may be determined by the spirit level, the vertical stretch of the plumb line will at its point of intersection of the linear scale indicate on such scale the precise length of the side D and thus the exact distance from the end of the pipe at which the cut is to be made.

Although I have herein shown and described only one form of measuring instrument embodying my invention, it is to be understood that various changes and modifications may be made therein without departing from the spirit of the invention and the spirit and scope of the appended claims.

What I claim is:

1. A geometrical instrument comprising a support having a linear scale thereon, a protractor carried by said support and having its index at one end of the scale, a bar mounted upon the support in parallelism with said scale, means whereby the bar is adjustably mounted upon the support for varying the position thereof with respect to said scale, a rule having a scale on said support for determining the position of the bar, a flexible line connected at the index of the protractor and passing over said bar in a direction determinable by reference to said protractor and thence passing downward and providing a depending stretch, a plumb bob on the depending end of said line, and means on the bar for maintaining an adjusted position of the line thereon.

2. A geometrical instrument comprising a support having a linear scale thereon, a protractor carried by said support adjacent said scale, a bar carried by said support above and in parallelism with said scale, means for adjusting the position of the bar, a flexible line connected with the index of the protractor and adapted to be passed over said bar and to depend therefrom and across said scale, and a plumb bob on the depending end of said line.

3. A geometrical instrument comprising a support having a linear scale thereon, a protractor carried by said support adjacent said scale, a bar carried by said support above and in parallelism with said scale, means for adjusting the position of the bar, a flexible line connected with the index of the protractor and adapted to be passed over said bar and to depend therefrom and across said scale, a plumb bob on the depending end of said line, and leveling means carried by said support to level the scale with relation to the depending portion of the line.

4. A geometrical instrument comprising a support having a linear scale thereon, a protractor carried by said support adjacent said scale, a bar carried by said support above and in parallelism with said scale, means for adjusting the position of the bar, a flexible line connected with the index of the protractor and adapted to be passed over said bar and to depend therefrom and across said scale, a plumb bob on the depending end of said line, and leveling means secured to said support and spaced therefrom adjacent said scale, the depending portion of said line passing between the leveling means and the support and thereby retained between the same.

5. A geometrical instrument comprising a support having a relatively horizontal linear scale, a member carried by said support above said scale, means for adjusting the position of said member with respect to the scale, a protractor carried by the support with its index at one end of the scale, a flexible line connected with the index of the protractor and adapted to be brought into engagement with said member and to depend therefrom to form a plumb line crossing said scale, and a plumb bob on the depending end of said plumb line.

ELIZABETH H. GATES.